Patented May 16, 1950

2,507,515

UNITED STATES PATENT OFFICE 2,507,515

BIS-TRIHYDROCARBON SILYLPHENYL SILANES

Harold A. Clark, Midland, Mich., assignor to Dow Corning Corporation, Midland, Mich., a corporation of Michigan No Drawing. Application February 23, 1949, Serial No. 77,990

5 Claims. (Cl. 260—448.2)

This invention relates to organo silane polymers.

In the applicant's copending application, filed concurrently herewith and assigned to the Dow Corning Corporation compounds of the type $R'_3SiRSiR'_3$ were disclosed and claimed. The present invention deals with compounds having two R groups per molecule.

It is an object of this invention to prepare compounds which are useful as vacuum diffusion pump fluids, lubricants and constant temperature baths. Other objects and advantages will be apparent from the following description.

This invention relates to compounds of the type

where each R is a phenyl or methyl radical.

The compounds of this invention may be prepared by condensing a chlorinated tetraorgano silane of the type $R_3SiC_6H_4Cl$ with a dichlorosilane of the type $R_2SiCl_2$. The condensation may be carried either by means of the Grignard reagent or by a Wurtz reaction. The latter is a preferred method.

More specifically a mixture of the dichlorosilane and the tetrasilane may be reacted with an alkali metal such as sodium, potassium or lithium in a toluene solution. Condensation takes place to produce a trimeric silphenane with the concurrent splitting out of alkali metal chloride. The latter is then filtered and the solvent removed at reduced pressure.

The compounds of this invention are liquids of varying viscosities. They are characterized by extreme thermal stability and high oxidation resistance. The compounds may be heated indefinitely at 350° C. in the absence of oxygen without undergoing thermal rearrangement. In the presence of oxygen they may be heated indefinitely at 150° C. and for limited periods of time at temperatures up to 250° C. without showing any decomposition. In addition the materials are extremely stable to alkali and acid reagents. This is in contrast with the corresponding siloxanes which are rearranged by such reagents.

The above combination of properties makes the present compounds useful for many applications. These include use as lubricants, vacuum diffusion pump fluids and as the liquid medium for constant temperature baths.

In order that those skilled in the art may better understand this invention, recourse may be had to the following examples which should be considered as illustrative only.

EXAMPLES

Example 1

97.9 g. of chlorophenyltrimethylsilane was mixed with 50.6 g. of phenylmethyldichlorosilane in 200 cc. of toluene. The toluene solution was added to 27 g. of molten sodium in 500 cc. of refluxing toluene. The reaction was exothermic so that reflux of the solvent was maintained by regulating the rate of addition of the reactants. After three hours the reaction was complete and the mixture was filtered and toluene was removed at reduced pressure. The residue was a clear oil having a viscosity of 4120 cs. at 25° C. This material was

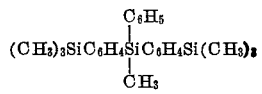

This compound has a boiling point of 194° to 201° C. at 0.5 mm., a freezing point of —4° C. and a refractive index of 1.5604 at —25° C. The compound was placed in a single stage diffusion pump and operated at 194° C. with a fore pressure of 30 microns. A pressure of $1.7 \times 10^{-5}$ was obtained in less than 25 minutes after the oil began to boil.

Example 2

The compound

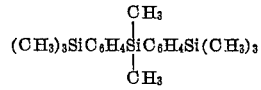

was prepared according to the method of Example 1 by reacting 200 g. of chlorophenyltrimethylsilane with 70 g. of dimethyldichlorosilane and 54 g. of molten sodium. The compound is an oil having a viscosity of 28.6 cs. at 25° C. and a boiling point of 142° C. at 25 mm.

Example 3

The compound

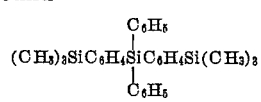

was prepared according to the method of Example 1 by reacting 125.9 g. of chlorophenyltrimethylsilane, 85.7 g. of diphenyldichlorosilane and 34.3 g. of molten sodium. The compound is a viscous material boiling at 205° to 215° C. at 0.3 mm.

That which is claimed is:

1. A compound having the formula

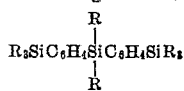

where each R is selected from the group consisting of phenyl and methyl radicals.

2.
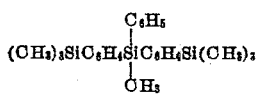

3.
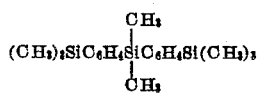

4.
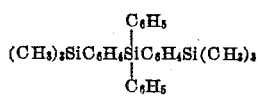

5. The process for producing compounds of the type

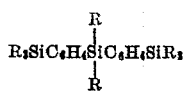

where each R is selected from the group consisting of phenyl and methyl radicals which comprises reacting a compound of the type $R_3SiC_6H_4X$ in which X represents a halogen atom, with a compound of the type $R_2SiCl_2$ by contacting the two with an alkali metal.

HAROLD A. CLARK.

REFERENCES CITED

The following references are of record in the file of this patent:

UNITED STATES PATENTS

| Number | Name | Date |
|---|---|---|
| 2,352,974 | Rochow | July 4, 1944 |

OTHER REFERENCES

Goodwin: "Jour. Am. Chem. Soc.," vol. 69 (1947), page 2247.

Sommer: "Jour. Am. Chem. Soc.," vol. 69 (1947), page 980.

Bluestein: "Jour. Am. Chem. Soc.," vol. 69 (1947), pages 3068–71.